Oct. 18, 1927.

T. W. MOORE 1,646,163

MOTOR VEHICLE LUGGAGE CARRIER

Filed Jan. 24, 1927

T. W. Moore
INVENTOR

BY John M. Spellman
ATTORNEY

Patented Oct. 18, 1927.

1,646,163

UNITED STATES PATENT OFFICE.

THOMAS W. MOORE, OF DALLAS, TEXAS.

MOTOR-VEHICLE LUGGAGE CARRIER.

Application filed January 24, 1927. Serial No. 163,023.

This invention relates to improvements in luggage carriers, more particularly for motor vehicles. The primary object of the invention is to provide a luggage carrier for utilizing the space between the front and rear fenders of a vehicle and extending from the running board of the vehicle to the top of the automobile body.

Another object of the invention is to provide a luggage carrier constructed of waterproof and dirt and dust-proof material such as canvas and which is capable of being folded into a small bundle and stored away when not in use.

With the above and other further objects in view the invention will be clearly understood from a perusal of the following detailed description, taken in connection with the accompanying drawings and wherein.

Proceeding in accordance with the drawings and wherein similar numerals indicate the various parts, 1 denotes a motor vehicle of the "open" type. The invention, however, may be used on all types of motor vehicles by making the carrier of proper size.

Figure 2:
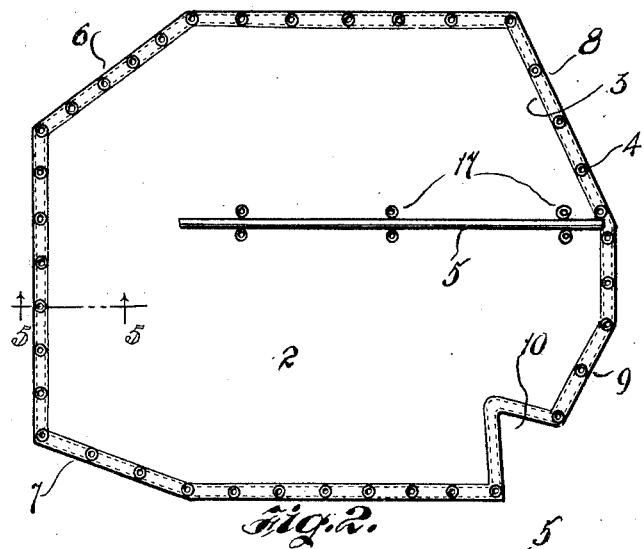
Figure 2 is a top plan view of the carrier.
Figure 3:
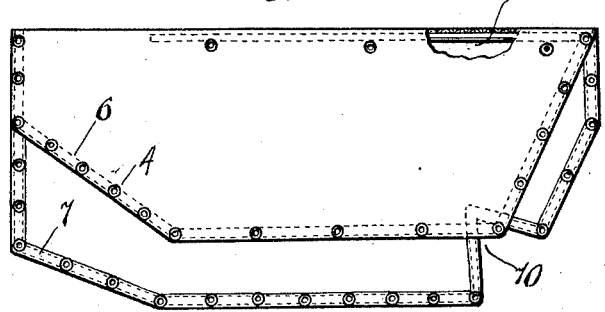
Figure 3 is a view of the carrier in folded position.
Figure 5:
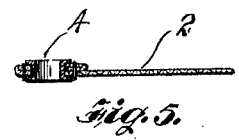
Figure 5 is a detail sectional view along line 5—5 of Figure 2.

As depicted in Figure 2, the luggage carrier is constructed of strong water-proof cloth 2, such as khaki, and is of substantially square formation, the corners being cut in the manner shown. The edges of the cloth are folded over at 3, stitched and grommets 4 placed thereon. In Figure 3 the carrier is illustrated as folded and shows a pole 5 for suspending the carrier from a vehicle.

It will be observed that the cloth is cut diagonally at 6, 7, 8 and 9 and includes a notch or recess 10. The object of cutting the cloth in this manner is to enable the carrier to assume the position shown in vertical section in Figure 4.

Figure 1:
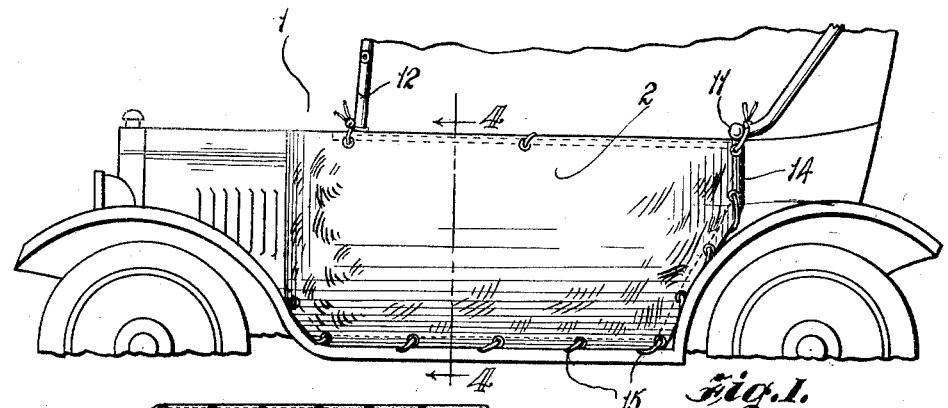
Figure 1 is a side elevational view of a motor vehicle of the "open" type, and illustrating the carrier in position thereupon.

In suspending the carrier from the vehicle, it is folded over the pole 5, as shown in Figures 1 and 3, the grommets 4 aligned with one another and laced with a stout cord or rope, and the end of the cloth (to the left in Figure 3) folded inwardly against the end of the pole,—the opposite end of the pole then lying just inside the cloth. The ends of the pole are then secured to the knob 11 or projection which supports the top of the vehicle and to the wind shield frame 12. Due to the notch or recess 10 and the diagonally cut portions 8 and 9 the carrier has its inner side lying snugly against the vehicle body with its bottom flat on the running board 13, clearly shown in Figure 4. The object in having the end of the carrier extended beyond one end of the pole is to allow for additional space when required. This folded over part may be extended out to its full length, thus supplying additional space.

It will be noticed also that the rear end of the carrier at 14 is snugly held over approximately half the surface of the rear fender. In placing the carrier in position the lacing cord or rope 15 is laced through the grommets and to the regular running board iron 16, and thus the body of the carrier is held securely in position. The end 14 does not lap over the rear fender, that is laterally or away from the body of the automobile, hence any mud, dust or dirt will not collect upon this end of the carrier. Grommets 17 are also provided to hold the pole in position. When not in use the luggage carrier can be folded into a small bundle and stored out of the way. The carrier is placed on the side of the vehicle nearest the steering wheel, since it will necessarily interfere with the opening of the doors on one side of the automobile. Either side of the vehicle may be used, however, for suspending the device, as preferred.

Figure 4:
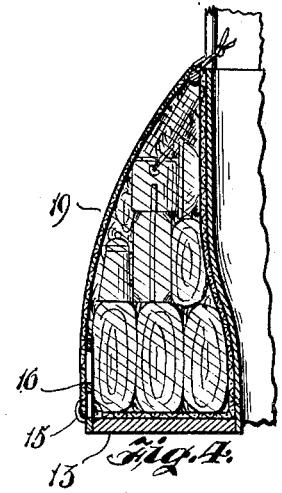
Figure 4 is a vertical sectional view taken along the line 4—4 of Figure 1.

As depicted in Figure 4, a large amount of baggage, camping equipment, and the like, may be placed in the carrier. Also, due to its cut and formation, the outside or exposed surface of the luggage carrier 19 forms a curve which very effectually assists in shedding water and does not detract from the appearance of any vehicle upon which it is placed.

The operation of the device will be evident from the foregoing description. To assemble the bag, it may be first laid flat, as shown in Fig. 2, and the rod 5 laid across it, between the grommets 17. The cloth is then folded over the rod 5 upon itself as indicated in Fig. 3, and is then tied to the fixed members 11 and 12 of the automobile in the manner indicated in Fig. 1, lacings being inserted through the grommets 17 and tied to the fixed members 11 and 12. The bag is then folded over at the bottom, as shown in Fig. 4, and before lacing the lower edges the goods are packed upon the running board, being arranged in layers as indicated in Fig. 4. This is easily accomplished by lifting the forward flap of the bag or carrier. When the goods have been assembled, the lower layer resting upon the bottom of the folded over cloth, the front flap of the bag is now lowered and the free edges of the bag are secured together by suitable lacings which connect the front flap 19 with the bottom flap, and also with the fixed member 16 of the vehicle, thus holding the bag securely in position. The side edges are also secured together in the same manner by means of lacings, which lacings extend also through the diagonal portions 6 and 7, and 8 and 9. It will be noted that in assembling the carrier the notched portion 10 fits into the corner provided by the side of the vehicle and the rear fender.

It will also be noted that when the bag has been assembled and packed upon the running board, that portion of the bag formed by the diagonally cut edges will extend partly over the front and rear fenders and thus completely utilize all available space.

Obviously, modifications and changes may be made in the construction of the carrier, such as will come within the scope and meaning of the appended claims.

I claim:

1. A luggage carrier for motor vehicles or the like comprising a body portion of waterproof cloth or light flexible material, which when disassembled and spread flat is substantially square, a pole adapted to extend substantially centrally across the cloth when the same is folded over with its free edges downward, said pole being adapted to be secured adjacent its ends to fixed members of the vehicle, and means for securing together the three downwardly extending edges of the cloth to form a bag after the goods have been assembled upon the running board of a vehicle.

2. A luggage carrier as set forth in claim 1 wherein the pole has one end spaced inwardly from one end of the carrier to permit said end of the carrier to be folded against one end of the pole for adjustment purposes.

3. A luggage carrier for motor vehicles and the like designed to be assembled, packed and carried upon the running board of a vehicle, and secured to permanent parts thereof with portions of the carrier extending over the vehicle fenders, said carrier comprising a body portion of cloth of light flexible material, which, when disassembled and spread out flat is approximately square, but is provided with diagonally cut portions designed when the carrier is assembled to extend over the vehicle fenders, a pole adapted to extend substantially centrally across the cloth when the cloth is folded over with its free ends down and means for securing the edges of the cloth together to form a bag after the contents thereof has been packed upon the running board, that portion of the carrier formed by the diagonally cut portions of the cloth providing extensions over the fenders of the vehicle.

4. A luggage carrier for motor vehicles or the like, comprising a body portion of cloth of light flexible material which, when disassembled and spread out flat is substantially square, said cloth having aligned perforations extending centrally thereof in two rows, a pole adapted to be enclosed between the two rows of perforations when the cloth is folded over with its free edges down, marginal perforations spaced along the edges of the cloth and lacings for securing the edges of the cloth together to form a bag.

5. A luggage carrier for motor vehicles and the like, designed to be assembled, packed and carried upon the running board of the vehicle, and secured to the permanent parts of the vehicle, with portions of the carrier extending over the vehicle fenders, said carrier comprising a body portion of cloth or like flexible material, which, when disassembled and spread out flat is approximately square, but is provided with diagonally cut portions designed to extend over the vehicle fenders when the carrier is assembled, said cloth having aligned perforations extending centrally thereof in two rows, a pole adapted to be enclosed between the two rows of perforations when the cloth is folded over with its free edges down, marginal perforations spaced along the edges of the cloth, and lacings for securing the edges of the cloth together to form a bag and to secure the same to the vehicle, that portion of the carrier formed by the diagonally cut portion of the cloth providing extensions over the fenders of the vehicle.

In testimony whereof I affix my signature.

THOMAS W. MOORE.